(12) United States Patent
Vaynberg

(10) Patent No.: US 11,787,972 B2
(45) Date of Patent: Oct. 17, 2023

(54) COARSE PARTICLE SOLID NONIONIC SYNTHETIC ASSOCIATIVE THICKENERS FOR PAINT FORMULATIONS AND METHODS FOR PRODUCING THE SAME

(71) Applicant: HERCULES LLC, Wilmington, DE (US)

(72) Inventor: Abraham K. Vaynberg, Cherry Hill, NJ (US)

(73) Assignee: HERCULES LLC, Wilmington, DE (US)

( * ) Notice: Subject to any disclaimer, the term of this patent is extended or adjusted under 35 U.S.C. 154(b) by 484 days.

(21) Appl. No.: 17/252,187

(22) PCT Filed: Jun. 13, 2019

(86) PCT No.: PCT/US2019/036923
§ 371 (c)(1),
(2) Date: Dec. 14, 2020

(87) PCT Pub. No.: WO2019/241487
PCT Pub. Date: Dec. 19, 2019

(65) Prior Publication Data
US 2021/0253897 A1    Aug. 19, 2021

Related U.S. Application Data

(60) Provisional application No. 62/685,478, filed on Jun. 15, 2018.

(51) Int. Cl.
| | |
|---|---|
| C08L 1/26 | (2006.01) |
| C08L 71/02 | (2006.01) |
| C09D 175/08 | (2006.01) |
| C09D 7/65 | (2018.01) |
| C08J 3/12 | (2006.01) |
| C08K 3/36 | (2006.01) |
| C08G 18/24 | (2006.01) |
| C08G 18/28 | (2006.01) |
| C08G 18/48 | (2006.01) |
| C08G 18/75 | (2006.01) |
| C08G 65/333 | (2006.01) |

(52) U.S. Cl.
CPC .......... *C09D 175/08* (2013.01); *C08G 18/246* (2013.01); *C08G 18/2825* (2013.01); *C08G 18/4833* (2013.01); *C08G 18/758* (2013.01); *C08G 65/33355* (2013.01); *C08J 3/12* (2013.01); *C08K 3/36* (2013.01); *C08L 1/26* (2013.01); *C08L 71/02* (2013.01); *C09D 7/65* (2018.01); *C08J 2371/02* (2013.01); *C08J 2375/08* (2013.01)

(58) Field of Classification Search
CPC ......... C08L 1/26; C08L 71/02; C09D 175/08; C09D 7/65; C08G 18/246; C08G 18/2825; C08G 18/4833; C08G 18/758; C08G 65/33355; C08J 3/12; C08J 2371/02; C08J 2375/08; C08K 3/36
USPC .......................................................... 524/42
See application file for complete search history.

(56) References Cited

U.S. PATENT DOCUMENTS

| | | | |
|---|---|---|---|
| 6,479,573 B2 * | 11/2002 | Burdick | C09K 3/00 524/424 |
| 7,875,355 B2 | 1/2011 | Rouge et al. | |
| 2013/0030091 A1 * | 1/2013 | Bhargava | C08L 13/02 524/48 |

OTHER PUBLICATIONS

References cited in the International Search Report of International Application No. PCT/US19/036923.

* cited by examiner

*Primary Examiner* — Kelechi C Egwim
(74) *Attorney, Agent, or Firm* — William Davis; Nathalie Tietcheu

(57) ABSTRACT

The present disclosure relates generally to a particulate product. The particulate product comprises coarse particles of a nonionic synthetic associative thickener (NSAT) rheology modifier. The NSAT rheology modifier is selected from the group consisting of hydrophobically-modified ethoxylated urethane (HEUR), hydrophobically-modified polyacetal-polyether (HMPAPE), and combinations thereof. The particulate product is incorporated into a waterborne paint formula.

29 Claims, 6 Drawing Sheets

COARSE PARTICLE SOLID NONIONIC SYNTHETIC ASSOCIATIVE THICKENERS FOR PAINT FORMULATIONS AND METHODS FOR PRODUCING THE SAME

CROSS-REFERENCE TO RELATED APPLICATIONS

This application is a U.S. National Phase filing under 35 U.S.C. § 371 of International Application No. PCT/US2019/036923 filed Jun. 13, 2019, which claims benefit of priority U.S. Provisional Patent Application No. 62/685,478 filed Jun. 15, 2018. The entire disclosures of which are hereby incorporated in their entirety.

BACKGROUND

1. Field of the Invention

The presently disclosed and/or claimed inventive process(es), procedure(s), kits(s), method(s), product(s), result(s), and/or concept(s) (collectively referred to hereinafter as the "present disclosure") relates generally to a particulate product for use in waterborne paint formulas and methods of preparing the same. More particularly, but not by way of limitation, the present disclosure relates to a particulate product comprising a nonionic synthetic associative thickener (NSAT) rheology modifier. In one non-limiting embodiment, the NSAT rheology modifier is selected from the group consisting of hydrophobically-modified ethoxylated urethane (HEUR), hydrophobically-modified polyacetal-polyether (HMPAPE), hydrophobically modified polyethylene glycol (HMPEG), and combinations thereof. Additionally, the present disclosure relates to compositions and methods of making a waterborne paint formula comprising a particulate product comprising an NSAT rheology modifier having an average particle size in a range of from about 0.5 to about 5.0 mm.

2. Background of the Invention

Water-soluble polymers (also commonly referred to as "thickeners" or "rheology modifiers") are widely used in many industrial waterborne systems as additives to modify flow behavior. More specifically, rheology modifiers are designed to impart desirable rheological properties to waterborne systems under specified processing conditions and end use situations.

In recent years, synthetic associative thickeners have increased in importance, particularly in controlling the rheology of waterborne coatings and latex paints. Since synthetic associative thickeners are prepared from basic chemicals, they can be prepared with certain properties in mind. In other words, synthetic associative thickeners can be tailored for desired and/or targeted properties from the ground up. Synthetic associative thickeners serve several roles in aqueous systems. For instance, in latex paints and waterborne coatings, the thickener provides improved stability and pigment suspension, as well as improved rheological and application properties. In personal care products, the thickeners provide improved body, feel, smoothness, and richness of the product, making the product aesthetically more pleasing.

Due to their ability to provide superior rheological characteristic, such as, by way of example only, spatter and sag resistance, leveling, and brush flow, nonionic synthetic associative thickener (NSAT) rheology modifiers have enjoyed widespread use in waterborne paints and coatings. NSAT rheology modifiers include, but are not limited to, hydrophobically-modified ethoxylated urethane (HEUR), hydrophobically-modified polyacetal-polyether (HMPAPE), and/or combinations thereof.

Currently, NSAT rheology modifiers are manufactured at production facilities, added to water as molten solids and allowed to dissolve, and then shipped to customers as polymers in an aqueous solution to be used in aqueous systems such as waterborne protective coatings. These aqueous solutions are typically highly concentrated with as low of an as-supplied viscosity as possible so as to allow ease of pouring, pumping, and dosing into paint formulations. The active solid contents of these solutions generally range from about 15 to about 25 wt %.

It is well known that NSAT rheology modifier products delivered in an aqueous delivery vehicle are difficult to prepare and suffer many other disadvantages and limitations. The high-water contents of these products mean that customers are paying to ship substantial quantities of water, wasting fuel and negatively impacting the environment. In addition to excess shipping cost, these products are often packaged in drums or totes, increasing the packaging cost of the active product. Disposal or recycling of the packaging materials has both negative cost and environmental consequences. Upon delivery, the polymers in aqueous solution must be stored in tanks, imposing environmental temperature storage restrictions and requiring additional storage space.

NSAT rheology modifier products delivered in solution may also create problems during the manufacture of aqueous formulations and negatively impact the final product. Because of intermolecular association through their hydrophobic groups, aqueous solutions of associative thickeners exhibit high viscosities even at low concentrations. They can also adsorb onto the hydrophobic surfaces of dispersed particles, such as latex and pigments. As a result, the associative thickeners have a much greater thickening effect than the corresponding polymer having the same molecular weight but with no hydrophobic groups. In order to permit the NSAT rheology modifier products to be more readily handled in the coating/manufacturing plant, steps must be taken to reduce the as-supplied viscosity to manageable levels.

One known method for solving the problem of high viscosity is dissolving the associative thickener in water and then adding the solution to the aqueous formulation. However, this approach restricts the amount of polymer that can be dissolved in a given amount of water without encountering very high viscosity. Additionally, water must be added at appropriate points throughout the manufacturing process, such as, byway of example only, as the solvent. This is especially true in "low" volatile organic compound (VOC) formulas. Since the use of water to deliver NSAT rheology modifiers reduces the amount of available "free" water, it limits both product compositions and the manufacturer's process design flexibility. Furthermore, when making final viscosity adjustments to achieve the desired paint viscosity, it is undesirable to add water to the paint since this undesirably dilutes the ingredients of the paint.

Another approach commonly used to prevent high viscosity buildup is to add viscosity suppressants and biocides, such as solvents or surfactants, to reduce the as-supplied viscosity to manageable levels. Unfortunately, not only do these additives not contribute to the performance of the formulated paint, but they can deleteriously impact key paint properties and represent a significant cost of the final product. Viscosity suppressants also often contain VOCs which are undesirable for both health and environmental reasons.

Due to the drawbacks of aqueous delivery, solid formulations of NSAT rheology modifiers have been considered. In both aqueous and solid form, it has been important to use an NSAT rheology modifier with sufficiently small particle size (for example, below about 1.0 mm) such that it will easily dissolve for manageable processing. See, for example, US 2015/0112000 filed by Prachur Bhargava et al., hereby incorporated herein by reference in its entirety, which discloses using NSAT rheology modifier particles wherein less than 5% of such particles are retained on a 1.18 mm sieve (No. 16), or less than 5% particles retained on 300-micron sieve (No. 50), or less than about 5% particles retained on a 150-micron sieve (No. 100). It is known that small particle NSAT rheology modifiers are readily solubilized, resulting in robust incorporation into paint formulations and a greater thickening effect.

It has been found that particulate products comprising a nonionic synthetic associative thickener (NSAT) having an average particle size in a range from about 0.5 to about 5.0 mm and at least about 10% by weight of the NSAT is retained on a 1.18 mm sieve (No. 16) measured according to ASTM C136-06 Standard Test Method for Sieve Analysis of Fine and Coarse Aggregates can be (i) directly added to water to produce lump-free solution in less than 30 minutes of agitation; and/or (ii) added as a powder at any point in a paint production process, resulting in complete and rapid lump-free dissolution and incorporation.

DETAILED DESCRIPTION OF THE INVENTIVE CONCEPT(S)

Figure 1:
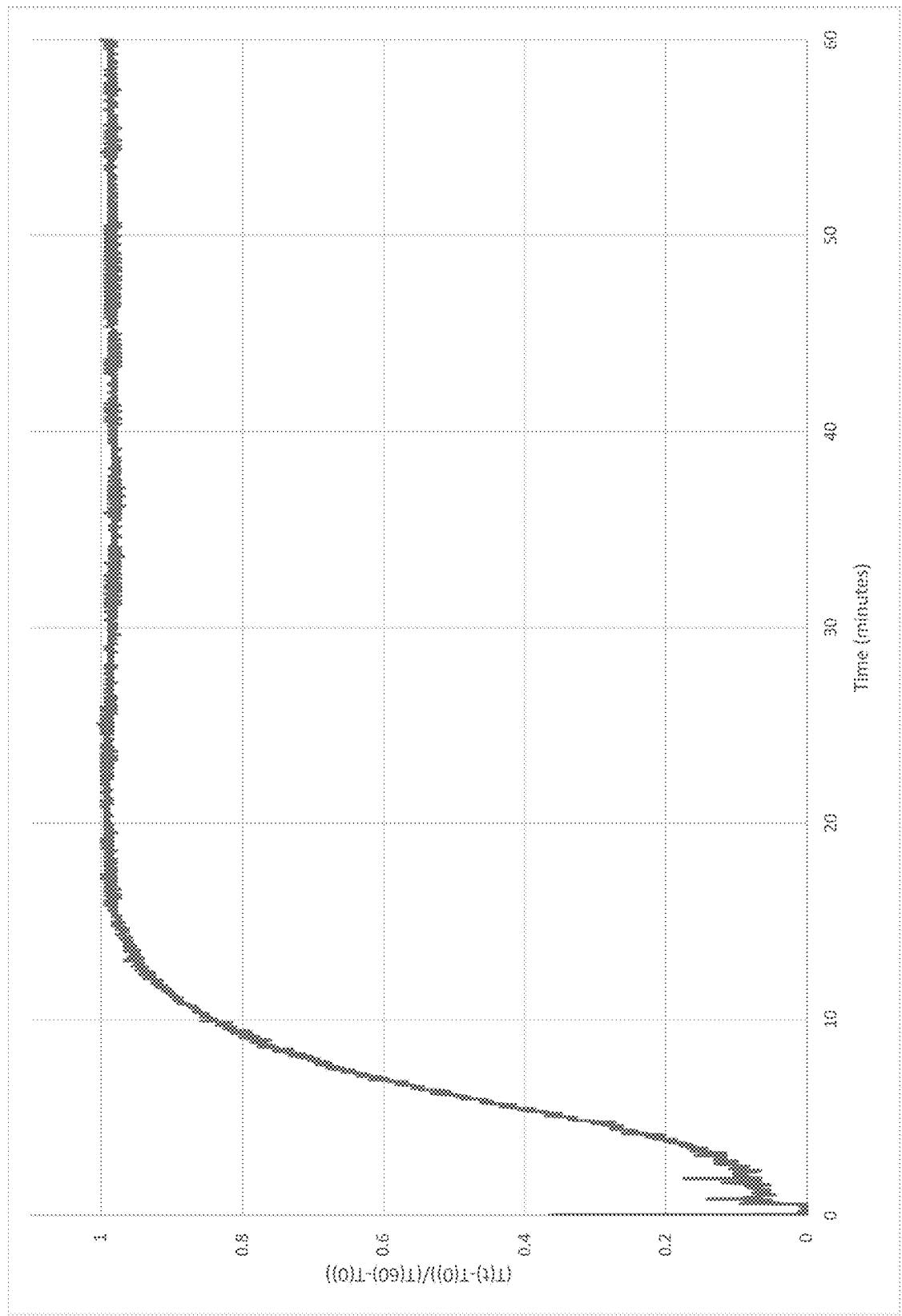
FIG. 1 is a graph comparing the relative torque build-up depicting the dissolution behavior in aqueous buffer as a function of time for the powdered sample produced in Example 4 as Type 1 containing the polymer produced in Example 2 ($C_{12}$—HMPAPE).
Figure 2:
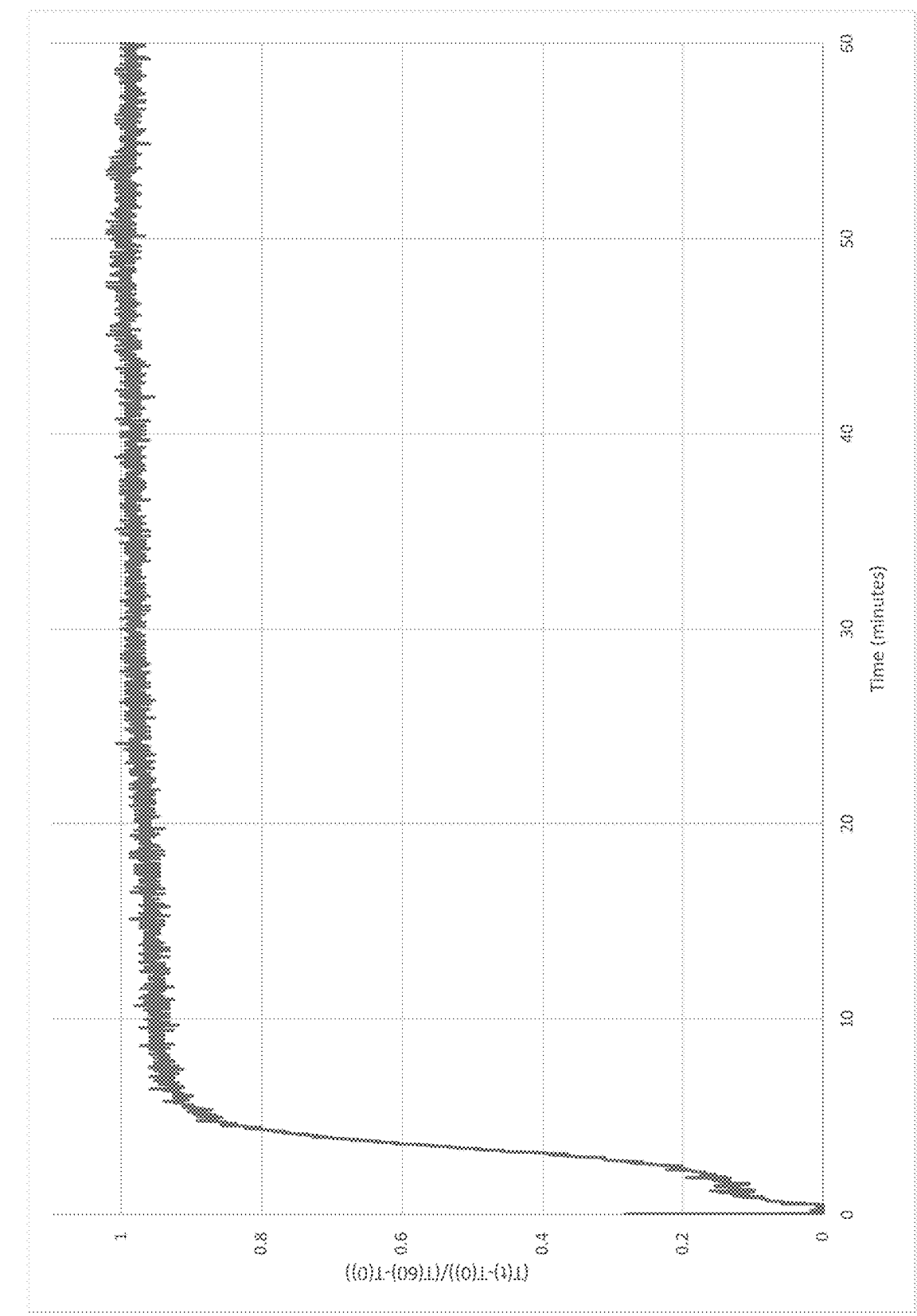
FIG. 2 is a graph comparing the relative torque build-up depicting the dissolution behavior in aqueous buffer as a function of time for the powdered sample produced in Example 6 as Type 3.
Figure 3:
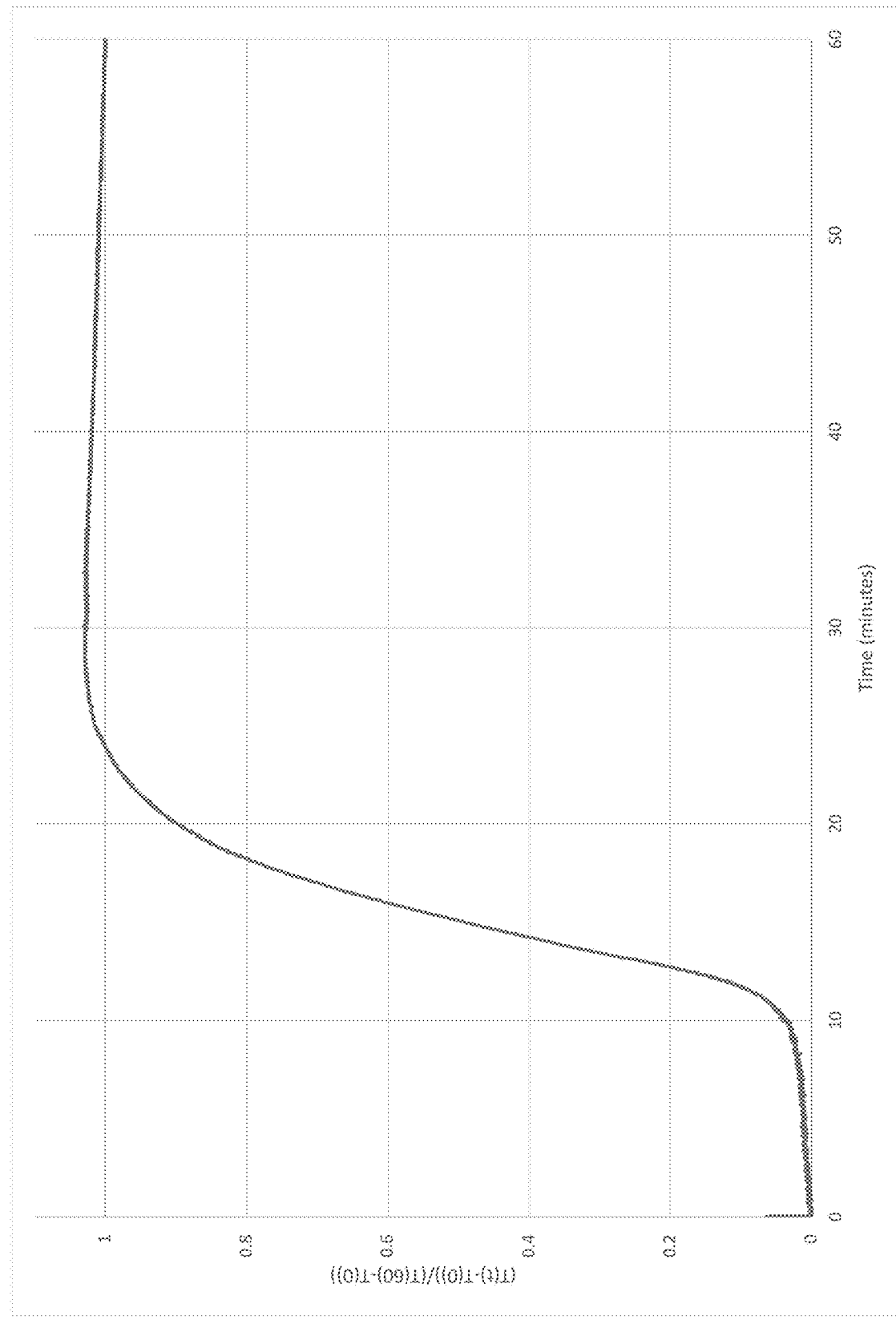
FIG. 3 is a graph comparing the relative torque build-up depicting the dissolution behavior in aqueous buffer as a function of time for the powdered sample produced in Example 4 as Type 1 containing the polymer produced in Example 1 ($C_{16}$-HMPAPE).
Figure 4:
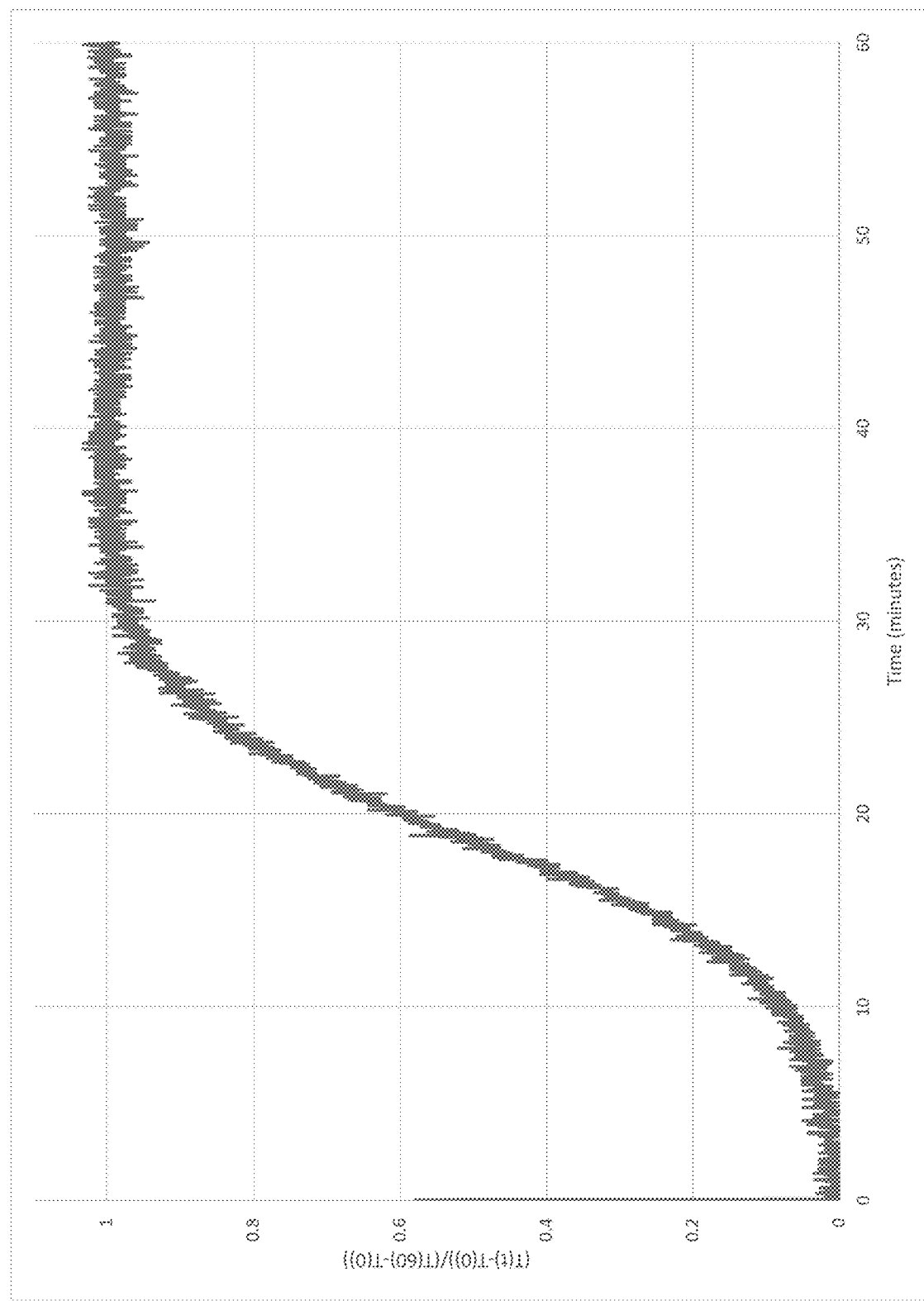
FIG. 4 is a graph comparing the relative torque build-up depicting the dissolution behavior in aqueous buffer as a function of time for the powdered sample described in Example 5 as Type 2.
Figure 5:
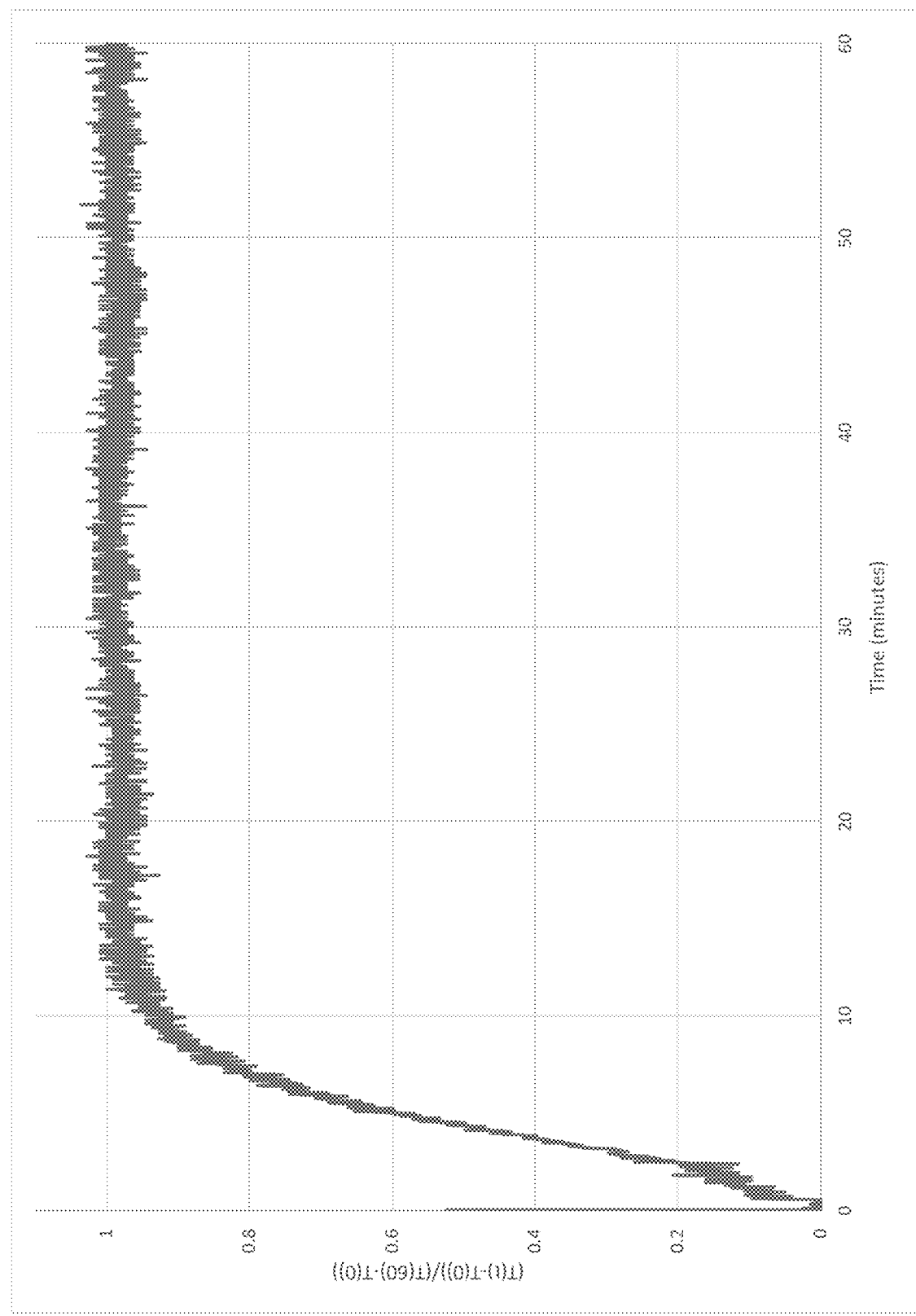
FIG. 5 is a graph comparing the relative torque build-up depicting the dissolution behavior in aqueous buffer as a function of time for the powdered sample produced in Example 4 as Type 1 containing the polymer produced in Example 3 ($C_6$-HMDI-HEUR).

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein any reference to "one embodiment" or "an embodiment" means that a particular element, feature, structure, or characteristic described in connection with the embodiment is included in at least one embodiment. The appearance of the phrase "in one embodiment" in various places in the specification are not necessarily all referring to the same embodiment.

Turning now to particular non-limiting embodiments, the present disclosure encompasses a particulate product, for use in preparation of a paint and/or coating formulation, comprising, consisting of, or consisting essentially of coarse particles of nonionic synthetic associative thickener (NSAT). In one non-limiting embodiment, the NSAT rheology modifiers can be selected from the group consisting of hydrophobically-modified ethoxylated urethane (HEUR), hydrophobically-modified polyacetal-polyether (HMPAPE), hydrophobically modified polyethylene glycol (HMPEG), and combinations thereof. In one non-limiting embodiment, the coarse particles of NSAT rheology modifiers have an average diameter size of about 0.5 mm to about 5.0 mm and at least about 10% by weight of the NSAT is retained on a 1.18 mm sieve (No. 16) measured according to ASTM C136-06 Standard Test Method for Sieve Analysis of Fine and Coarse Aggregates.

The particulate product can further comprise a dispersing agent. As used herein, the term "dispersing agent" refers to any compound or material that effectively wets out and separates the particulate product of the present disclosure in fluid. The dispersing agent can be one or more of a sugar, a salt, silica, and a surfactant. In one non-limiting embodiment, the salt may be an organic salt, an inorganic salt, or the salt of a polymer. The term "sugar(s)" as used herein means any substance in the class of soluble, crystalline carbohydrates that comprise monosaccharides, disaccharides, oligosaccharides, polysaccharides, and combinations thereof. Non-limiting examples of sugars utilized in accordance with the present disclosure can include, but are not limited to, fructose, galactose, glucose, lactose, maltose, sucrose, and combinations thereof). In one non-limiting embodiment, the sugar is sucrose.

In another non-limiting embodiment, the dispersing agent may be a water-insoluble substance such as silica, silicic acid, amorphous aluminosilicate, crystalline aluminosilicates, alumina, clays such as, by way of example only, bentonite, montmorillonite, and bauxite, and combinations thereof.

The dispersing agent may be a surfactant. The surfactant can be a nonionic or anionic surfactant. Examples of the nonionic surfactants can include, but are not limited to, $C_{12}$-$C_{18}$ fatty alcohol ethoxylates, $C_{12}$-$C_{14}$ fatty alcohol ethoxylates, $C_{16}$-$C_{18}$ fatty alcohol ethoxylates, $C_{13}$-$C_{15}$ oxo alcohol ethoxylates, $C_{10}$-$C_{18}$ alcohol ethoxylates, $C_{13}$ oxo alcohol ethoxylates, $C_{10}$ Guerbet alcohol ethoxylates, $C_{10}$ Guerbet alcohol alkoxylates, $C_{10}$ oxo alcohol ethoxylates, alkyl polyglucosides (e.g., $C_8$-$C_{10}$alkyl polyglucoside, $C_8$-$C_{14}$ alkyl polyglucoside, $C_{12}$-$C_{14}$ alkyl polyglucoside, blends of $C_{12}$-$C_{10}$ alkyl polyglucoside on inorganic and organic carrier, amine ethoxylates (e.g., oleyl amine+12 EO, coco amine+~12EO), aminopolyol (e.g., triethanol amine+ 18EO, ethylene diamine+4PO), alkyl pyrrolidones (e.g., N-octyl pyrrolidone, N-butyl pyrrolidone, N-dodecyl pyrrolidone), resin precursors and additives (e.g., Bisphenol A ethoxylates, BIS A+3 EO, BIS A+4 EO, BIS A+6 EO), emulsifiers and solubilizers (e.g., 4-$C_{10-13}$-sec-alkyl derivatives of benzenesulfonic acid calcium salts, castor oil+ ~20EO, castor oil+~35EO, castor oil+~40EO, epoxidized vegetable oil, ethoxylated rape seed oil, sorbitanester ethoxylated, decyl alcohol+~3EO, $C_8$ fatty alcohol+4EO, fatty alcohol ethoxylate, $C_8$-$C_{10}$ fatty alcohol+~5EO, $C_{12}$-$C_{14}$ fatty alcohol+~50EO, ethoxylated sorbitan trioleate, castor oil ethoxylate, phenol ethoxylate, alcohol ethoxylate, ethoxylated mono-/di glyceride), foam suppressors (e.g., polyalkoxyester and solvent, fatty alcohol alkoxylate, carboxylic acid ester, phosphoric acid ester, combination of paraffin and silicon on carrier, alkyl polyalkylene glycol ether, Guerbet alcohol $C_{16}$+~2EO, fatty alcohol alkoxylate), low-foaming nonionic surfactants (e.g., fatty alcohol alkoxylate, modified fatty alcohol polyglycol ether, amine alkoxylate, end-capped Guerbet alcohol alkoxylate, end-capped fatty alcohol alkoxylate, PO/EO block copolymers), lauramine oxide, cocamidopropylamine oxide, alkylamido propyl betaine, polyglycol ether of an aliphatic diol, oleic acid amide+10 EO, emulsifiable methyl canolate, unsaturated fatty alcohol ethoxylate, fatty alcohol poly glycol ethers, fatty alcohol poly glycol ethers with fatty acid, unsaturated fatty alcohol ethoxylate), polyethylene glycols, polypropylene glycols, methyl polyethylene glycols, alkyl polyalkylene glycol copolymers, alkyl polypropylene glycols, polyfunctional polyalkylene glycols, reactive polyalkylene glycols.

Other examples of nonionic surfactants can include, but are not limited to, alkylphenol ethoxylates such as nonylphenol ethoxylates and octylphenol ethoxylates, secondary alcohol alkoxylates such as secondary alcohol ethoxylates (TERGITOL™15-S-9, commercially available from The Dow Chemistry Company), and primary alcohol alkoxylates.

Examples of anionic surfactants can include, but are not limited to, sodium salt of lauryl ether sulfate+2EO, sodium salt of iso-tridecyl alcohol ether sulfate+20EO, sodium salt of fatty alcohol ether sulfate+2 EO, sodium salt of fatty alcohol ether sulfate+4 EO, sodium salt of fatty alcohol ether sulfate+7 EO, sodium salt of fatty alcohol ether sulfate+12 EO, sodium salt of fatty alcohol ether sulfate+30 EO, sodium salt of fatty alcohol ether sulfate+50 EO, sodium salt of $C_{12}$-$C_{14}$ fatty alcohol ether sulfate+1EO, sodium salt of $C_{12}$-$C_{14}$ fatty alcohol ether sulfate+2EO, sodium salt of $C_{12}$-$C_{14}$ fatty alcohol ether sulfate+3EO, ammonium salt of $C_8$-$C_{14}$ fatty alcohol sulfate, sodium salt of 2-ethylhexyl sulfate, sodium salt of $C_{16}$-$C_{18}$ fatty alcohol sulfate, sodium salt of $C_{12}$ fatty alcohol sulfate, sodium salt of $C_2$-$C_{14}$ fatty alcohol sulfate, sodium salt of $C_{12}$-$C_{16}$ fatty alcohol sulfate, sodium salt of $C_{12}$-$C_{18}$ fatty alcohol sulfate, sodium salt of $C_{16}$-$C_{18}$ fatty alcohol sulfate, sodium salt of $C_8$ fatty alcohol sulfate, sodium salt of linear $C_{10}$-$C_{13}$ alkyl benzene sulfonate, sodium salt of linear $C_{10}$-$C_{13}$ alkyl benzene sulfonic acid, potassium salt of oleic acid sulfonate.

Other examples of surfactants used in the present disclosure can include, but are not limited to, ester quats, sodium salt of alkyl ether phosphate, sodium-N-lauryl-iminodipropionate, acid phosphoric ester of a fatty alcohol ethoxylate+3EO, sodium salt of mono-alkenyl sulfosuccinamate, sodium salt of mono-alkenyl sulfosuccinate+5EO, sodium salt of di-isodecyl sulfosuccinate, sodium dioctylsulphosuccinate, acid phosphoric ester, amine salt of dodecylbenzenesulphonate, alkyl ester phosphate, and the like.

In one non-limiting embodiment, the dispersing agent may contain less than 10% of a surfactant by solids weight based on the weight of NSAT, or less than 1% of a surfactant by solids weight based on the weight of NSAT, or less than 0.1% of a surfactant by solids weight based on the weight of NSAT. In another non-limiting embodiment, the dispersing agent is surfactant-free.

The dispersing agent can be present in an amount of from about 1 to about 15% by solids weight based on the weight of NSAT, or from about 3% to about 14% by solids weight based on the weight of NSAT, or from about amount of from about 3% to about 10% by solids weight based on the weight of NSAT, or from about 3% to about 5% by solids weigh based on the weight of NSAT.

In one non-limiting embodiment, the dispersing agent comprises silica. The silica dispersing agent has an average particle diameter size greater than 150 nm, or from about 200 nm to about 200 µm, or from about 200 nm to about 100 µm, or from about 200 nm to about 1 µm, or from about 800 nm to about 200 µm, or from about 1 µm to about 50 µm, or from about 100 µm to about 200 µm. The silica can be present in an amount of from about 1 to about 15% by solids weight based on the weight of NSAT, or from about 3% to about 14% by solids weight based on the weight of NSAT, or from about amount of from about 3% to about 10% by solids weight based on the weight of NSAT, or from about 3% to about 5% by solids weigh based on the weight of NSAT. In one non-limiting embodiment, the silica can be a hydrophobic silica. An example of silica can include, but is not limited to, silicon dioxide (SIPERNAT™ 22s, commercially offered for sale from Evonik Corporation USA).

The particulate product of the present disclosure may permit a dramatic reduction in shipping costs and storage volume, as well as allow for the implementation and use of lower cost, more environmentally friendly packaging materials.

Latex paints are waterborne systems that are generally manufactured by a two-step process. First, a grind or dispersion stage is prepared by mixing dry paint pigments with other grind phase components, including, most other solid powder formulation materials, under constant high shear agitation to provide a high viscosity and high solids mixture. This part of the process is designed to effectively wet and dis-agglomerate the dry pigments and stabilize them in an aqueous dispersion. The second step of the paint manufacturing process is commonly referred to as the let-down or thin-down stage, because the viscous grind is diluted with the remaining formulation components, which are generally less viscous than the grind mix. Typically, latex resins, any predispersed pigments, and any other paint materials that only require mixing and perhaps moderate shear, are incorporated during the let-down stage. The let-down stage may be done either by sequentially adding the let-down components into a vessel containing the grind mix, or by adding the grind mix into a vessel containing a premix of the latex resins and other let-down components, followed by sequential addition of the final let-down components. In either case, constant agitation is needed, although application of high shear is not required. The presently disclosed and/or claimed coarse particulate product can be added at any point in a paint production process.

The term "particulate" is used herein to mean that the elements comprising the particulate product are in the form of discrete units denominated "particles." The particles can have any desired shape. For example, but not by way of limitation, the particles can be generally spherical, slightly elongate, flake-like, disc-like, and/or combinations thereof. As used herein, the term "flake" is used in a conventional sense and, generally speaking, includes thin pieces which have a length of about 0.5 to about 5.0 mm, a width of about 0.5 to about 5.0 mm, a thickness of about 0.1 to about 1.5 mm, or from about 0.5 to about 1.2 mm, or from about 0.5 to about 1.0 mm, and have a ratio of the length to width of about 10:1, or about 9:1, or about 8:1, or about 7:1, or about 6:1, or about 5:1, or about 4:1, or about 3:1, or about 2:1, or about 1:1. In one non-limiting embodiment, the thickness is about 1.0 mm.

The particle diameter of the coarse particulate product can be measured by sieve size analysis (ASTM C136-06 Standard Test Method for Sieve Analysis of Fine and Coarse Aggregates). In one non-limiting embodiment, the NSAT has an average particle diameter in a range of from about 0.5 to about 5.0 mm and at least about 10% by solids weight of the NSAT is retained on a 1.18 mm sieve (No. 16) measured according to ASTM C136-06 Standard Test Method for Sieve Analysis of Fine and Coarse Aggregates. In another non-limiting embodiment, the NSAT has a particle size in a range of from about 0.5 to about 4.75 mm, or from about 0.5 to about 4.2 mm, or from about 0.5 to about 4.0 mm, or from about 0.5 to about 3.35 mm, or from about 0.5 to about 2.8 mm, or from about 0.5 to about 2.36 mm, or from about 0.8 to about 4.75 mm, or from about 0.8 to about 4.2 mm, or from about 0.8 to about 4.0 mm, or from about 0.8 to about 3.35 mm, or from about 0.8 to about 2.8 mm, or from about 0.8 to about 2.36 mm, or from about 1.0 to about 4.0 mm, or from about 1.0 to about 3.35 mm, or from about 1.0 to about 2.8 mm, or from about 1.18 to about 4.0 mm, or from about 1.18 to about 3.35 mm, or from about 1.18 to about 2.8 mm. In another non-limiting embodiment, at least 20% particles are retained on a 1.18 mm sieve (No. 16), or at least 40% particles are retained on a 1.18 mm sieve (No. 16), or at least 50% particles are retained on a 1.18 mm sieve (No. 16), or at least 80% particles are retained on a 1.18 mm sieve (No. 16), or at least 100% particles are retained on a 1.18 mm sieve (No. 16). In yet another non-limiting embodiment, less than 5% particles are retained on a 2.36 mm sieve (No. 8).

The rheology properties of the waterborne system can be controlled via the type of NSAT. The NSAT can be selected from the group consisting of hydrophobically-modified polyacetal polyether (HMPAPE), hydrophobically-modified ethoxylated urethane (HEUR), hydrophobically modified polyethylene glycol (HMPEG) and combinations thereof.

In one non-limiting embodiment, the NSAT has at least one hydrophobic end group. The hydrophobic group can be selected from the group consisting of alkyl, aryl, alkylaryl, and cycloaliphatic moieties. In one non-limiting embodiment, the hydrophobic group is an alkyl moiety having from about 4 to about 16 carbon atoms, or from about 4 to about 14 carbon atoms, or from about 4 to about 12 carbon atoms, or from about 4 to about 10 carbon atoms, or from about 4 to about 6 carbon atoms.

NSAT polymer architectures are often tailored to address high or low shear rheology needs. Blending at least one rheology modifier represents a means of using a small base set of rheology modifiers to produce a broad range of custom products that are tailored to specific customer paint formulations. As such, the above-described particulate product further comprises an additional rheology modifier such as at least one cellulose ether. Non-exhaustive examples of the cellulose ethers include, but are not limited to, hydroxyethyl cellulose (HEC), carboxymethyl cellulose (CMC), methyl cellulose (MC), methylhydroxyethyl cellulose (MHEC), ethylhydroxyethyl cellulose (EHEC), methylhydroxylpropyl cellulose (MHPC), as well as hydrophobically-modified derivatives of the aforementioned cellulose ethers. In one embodiment, the NSAT can be blended with the additional rheology modifier to form a blended rheology modifier. Such blends may also contain the dispersing agent as previously disclosed.

The blended rheology modifier may be prepared in the molten phase prior to particle formation or as dry blends of individual powder components. In addition to tailoring rheology through blending, other functional ingredients utilized in paint manufacturing can also be incorporated into the NSAT rheology modifier particles to simplify paint manufacturing by reducing the number of materials which must be added during paint manufacturing. Examples of such functional ingredients include, but are not limited to, dispersants, wetting agents, surfactants, biocides, antifoam, and coalescents.

The particulate product can be prepared by using equipment in a multitude of ways which are commonly known to those skilled in the art of polymer processing. Examples of suitable equipment can include, but are not limited to, spray dryers, disc pastillators, drum flakers, and grinders. The specific process used will depend upon the synthetic process for the production of the NSAT rheology modifier as well as particle size requirements.

It is also possible to coat the NSAT rheology modifier particles with an additional rheology modifier, such as cellulose ether, or a functional ingredient. Additionally, it is also possible to coat the NSAT rheology modifier particles with hydrophobic, hydrophilic, and/or amphiphilic polymers, if desired. This coating step can be accomplished by any means commonly used, such as spray drying and the like.

The present disclosure relates to an aqueous coating composition comprising a film-forming polymer and the particular product described previously. In one non-limiting embodiment, the film-forming polymer can be latex used to make a waterborne paint. Generally, waterborne paints (latex paints) are the paints in which film-forming polymers are dispersed in solvents in form of small insoluble resin particles (colloids and coarse dispersions). The film-forming polymers can include, but are not limited to, polyvinyl acetate, styrene-butadiene copolymer, acrylics, polystyrene, and alkyds. The aqueous coating composition can further include one or more other ingredient including, but not limited to, a coalescent, a solvent, a wetting agent, a deformer, a matting agent, a dispersant, a thickener, a biocide, a mildewcide, a pigment, and a surfactant. The aqueous coating composition can comprise from about 0.1 wt % to about 5 wt %, or from about 0.4 wt % to about 5 wt %, or from about 0.5 wt % to about 3 wt %, or from about 1 wt % to about 3 wt % of the particulate product based on the total weight of the aqueous coating composition. In one non-limiting embodiment, the aqueous coating composition can comprise a paint.

The present disclosure also encompasses a method(s) of making the aqueous coating composition comprising the steps of (1) adding a film-forming polymer to an aqueous solution; (2) adding a particulate product comprising coarse NSAT rheology modifier particles to the aqueous solution to form an aqueous coating composition. In one non-limiting embodiment, the particulate product further comprises a dispersing agent.

In one non-limiting embodiment, the particulate product is added to the aqueous solution before the film-forming polymer is added to the aqueous solution. In particular, the method comprises: a) obtaining the previously described particulate product; b) adding the particulate product to the aqueous solution in the absence of a film-forming polymer to obtain a mixture; and c) adding the film-forming polymer to the mixture until the particulate product dissolves.

In another non-limiting embodiment, the particulate product is added to the aqueous solution after the film-forming polymer is added to the aqueous solution. The film forming polymer may be added to the aqueous solution, for example but not by way of limitation, by dispersing or emulsifying the polymer in the aqueous solution. In particular, the method comprises: a) obtaining the previously described particulate product; and b) mixing the particulate product and the aqueous solution having the film-former until the particulate product dissolves.

In yet another non-limiting embodiment, the particulate product is added to the aqueous solution at the same time the film-forming polymer is added to the aqueous solution.

The following examples illustrate the presently disclosed and claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLES

Polymer Synthesis

Example 1: $C_{16}$-HMPAPE

To an Abbe ribbon blender were added polyethylene glycol [PEG-8000 and MW of about 8000 g/mol (1250 g)] and sodium hydroxide (NaOH) (37 g) to form a PEG-800/NaOH mixture. After sealing the blender, the mixture was heated at about 80° C. for about one (1) hour. Dibromomethane (18.5 g) was then added to the PEG-8000/NaOH mixture and the resulting reaction mixture was heated at about 80° C. for about 4 hours to form a PEG-8000/methylene copolymer.

To the PEG-8000/methylene copolymer at about 80° C. was added 1-bromohexadecane (65 g) as a capping agent and the resulting reaction mixture was heated at about 120° C. for about two (2) hours. The blender was then opened and the molten reaction mixture was poured into a plastic tray. Upon cooling to 20-25° C., the reaction mixture was solidified to obtain $C_{16}$-capped poly(acetal-polyether) ($C_{16}$-HMPAPE) sample.

Example 2: $C_{12}$-HMPAPE

A $C_{12}$-HMPAPE sample was made according to Example 1 using 1-bromododecane (70 g) as the capping agent.

Example 3: $C_6$—HMDI-HEUR

PEG-8000 [MW of about 8000 g/mol (1250 g)] was dried by heating at about 120° C. while mixing under vacuum in a batch melt reactor for about one (1) hour. The mixture was cooled to about 85° C. Then hexyl alcohol (34.4 g) was added and mixed for about five (5) minutes. Then 4,4'-methylenebis (cyclohexyl isocyanate) (HMDI) (134.6 g) was added and mixed for about five (5) minutes. Dibutyltin dilaurate (DBTDL) was then added (3.2 g) and the resulting reaction mixture was heated from about 85° C. to about 115° C. for about two (2) hours while mixing. After about two (2) hours, the resulting molten polymer was removed from the reactor and cooled to yield the HEUR polymer as a white solid.

Powder Preparation

Example 4: Type 1

Each respective solid polymer from Examples 1-3 was ground in a Waring Professional Electric Spice Grinder. The ground material was sifted between stacked ASTM E-11 sieves No. 8 (2.38 mm) and No. 16 (1.18 mm), therefore representing particles with a size in a range between 1.18 and 2.38 mm (measured according to ASTM C136-06 Standard Test Method for Sieve Analysis of Fine and Coarse Aggregates). After grinding, the polymer was blended with 3% Sipernate 22S silica (Evonik Corporation). The resulting powder mixture was used for testing.

Example 5: Type 2

The solid polymer from Example 1 was ground in a Waring Professional Electric Spice Grinder. The ground material was sifted between stacked ASTM E-11 sieves No. 8 (2.38 mm) and No. 20 (0.84 mm), therefore representing particles with a size in a range between 0.84 and 2.38 mm (measured according to ASTM C136-06 Standard Test Method for Sieve Analysis of Fine and Coarse Aggregates). After grinding, the polymer was blended with 3% Sipernate 22S silica (Evonik Corporation). The resulting powder mixture was used for testing.

Example 6: Type 3

The solid polymer from Example 2 was made into flakes using 6"×8" single drum flaker with stainless steel drum and stainless-steel application roll. The flaked material was then ground in a Waring Professional Electric Spice Grinder. The ground material was sifted between stacked ASTM E-11 sieves No. 8 (2.36 mm) and No. 16 (1.18 mm), with at least about 50% by solids weight of the polymer is retained on the 1.18 mm sieve (measured according to ASTM C136-06 Standard Test Method for Sieve Analysis of Fine and Coarse Aggregates). After grinding, the polymer was blended with 3% Sipernat™ 22S silica (Evonik Corporation). The resulting powder mixture was used for testing.

Example 7: Type 4

The Type 4 polymer was made using the same procedure as in Example 6 without adding silica. The ground material was sifted between stacked ASTM E-11 sieves No. 8 (2.36 mm) and No. 16 (1.18 mm), with at least about 50% by solids weight of the polymer is retained on the 1.18 mm sieve (measured according to ASTM C136-06 Standard Test Method for Sieve Analysis of Fine and Coarse Aggregates). The resulting silica-free powder was used for testing.

Dissolution Testing

To illustrate improvements in dissolution characteristics arising from the incorporation of various additives, the samples obtained from the preceding Examples were subjected to aqueous and paint dissolution testing.

Aqueous Dissolution Test

The aqueous dissolution was monitored using an anchor blade coupled with a HAAKE VT500 viscometer. The powder samples from the preceding Examples were each separately dissolved in pH 8.0 Tris Buffer in an amount to make 1 wt %, 2 wt %, and 5 wt % solutions. The solutions were mixed at 500 rpm for about one (1) hour. Torque data was collected as a function of time which is analogous to dissolution as a function of time, as torque is related to the viscosity builds up of the solution which is dependent on the dissolution of the rheology modifier. FIGS. 1-5 depict the dissolution data for different samples from the preceding Examples. Table 1 summarizes the results of aqueous dissolution tests in FIGS. 1 to 5.

TABLE 1

Aqueous Dissolution Results

| FIG. | Polymer | Powder | Concentration | Results |
|---|---|---|---|---|
| 1 | $C_{12}$-HMPAPE | Type 1 | 5 wt % solution | Fully solubilized in less than 20 minutes |
| 2 | $C_{12}$-HMPAPE | Type 3 | 5 wt % solution | Fully solubilized in about 10 minutes |
| 3 | $C_{16}$-HMPAPE | Type 1 | 2 wt % solution | Fully solubilized in less than about 30 minutes |
| 4 | $C_{16}$-HMPAPE | Type 2 | 1 wt % solution | Fully solubilized in about 35 minutes |
| 5 | $C_6$-HMDI-HEUR | Type 1 | 5 wt % solution | Fully solubilized in about 15 minutes |

Paint Dissolution Test

Example 8

The paint dissolution was monitored using a marine propeller blade coupled with HAAKE VT500 viscometer. The dissolution was carried out in an 8 oz jar containing 70 PVC paint based on acrylic latex listed in Table 2.

TABLE 2

70PVC Acrylic Base Paint

| Ingredient | Weight % |
|---|---|
| Grind Stage | |
| Water | 16.78 |
| Proxel ™ GXL[1] | 0.22 |
| Tamol ™ 731A[2] | 0.43 |
| Igepal ® CO-660[3] | 0.18 |

TABLE 2-continued

70PVC Acrylic Base Paint

| Ingredient | Weight % |
| --- | --- |
| Igepal ® CO-897[4] | 0.29 |
| AMP-95 ™[5] | 0.09 |
| Propylene glycol | 1.19 |
| Drew ™ T-4507[6] | 0.09 |
| Celite ® 281[7] | 2.34 |
| Ti-Pure ™ R-931[8] | 7.02 |
| #10 White (CaCO$_3$) | 14.04 |
| ASP ® NCX-1[9] | 18.72 |
| Let-down Stage | |
| UCAR ® 379G[10] | 13.84 |
| Texanol ™[11] | 0.74 |
| Drew ™ T-4507 | 0.18 |
| Natrosol ™ Plus 550[12] | 0.39 |
| Type 3 | 0.4 |
| Water | 23.05 |

[1] 20% aqueous dipropylene glycol solution of 1,2-benzisothiazolin-3-one, commercially available from Arch Chemicals, Inc.
[2] a dispersant, commercially available from The Dow Chemical Company.
[3] Nonylphenoxy branched poly(ethylenoxy) ethanol, commercially available from Solvay S.A.
[4] Nonionic ethoxylated nonylphenol, commercially available from Solvay S.A.
[5] 2-amino-2-methyl-1-propanol, commercially available from Angus Chemical Company.
[6] A foam control agent, commercially available from Ashland LLC.
[7] Flux calcined diatomite, commercially available from Sigma-Aldrich.
[8] Rutile titanium dioxide, commercially available from The Chemours Company.
[9] Delaminated spray dried kaolin, commercially available from BASF Corporation.
[10] Vinyl Acrylic Latex, commercially available from Nexeo Solutions.
[11] Ester alcohol, commercially available from Eastman Chemical Company.
[12] Hydrophobically modified hydroxyethyl cellulose, commercially available from Ashland LLC.

Figure 6:
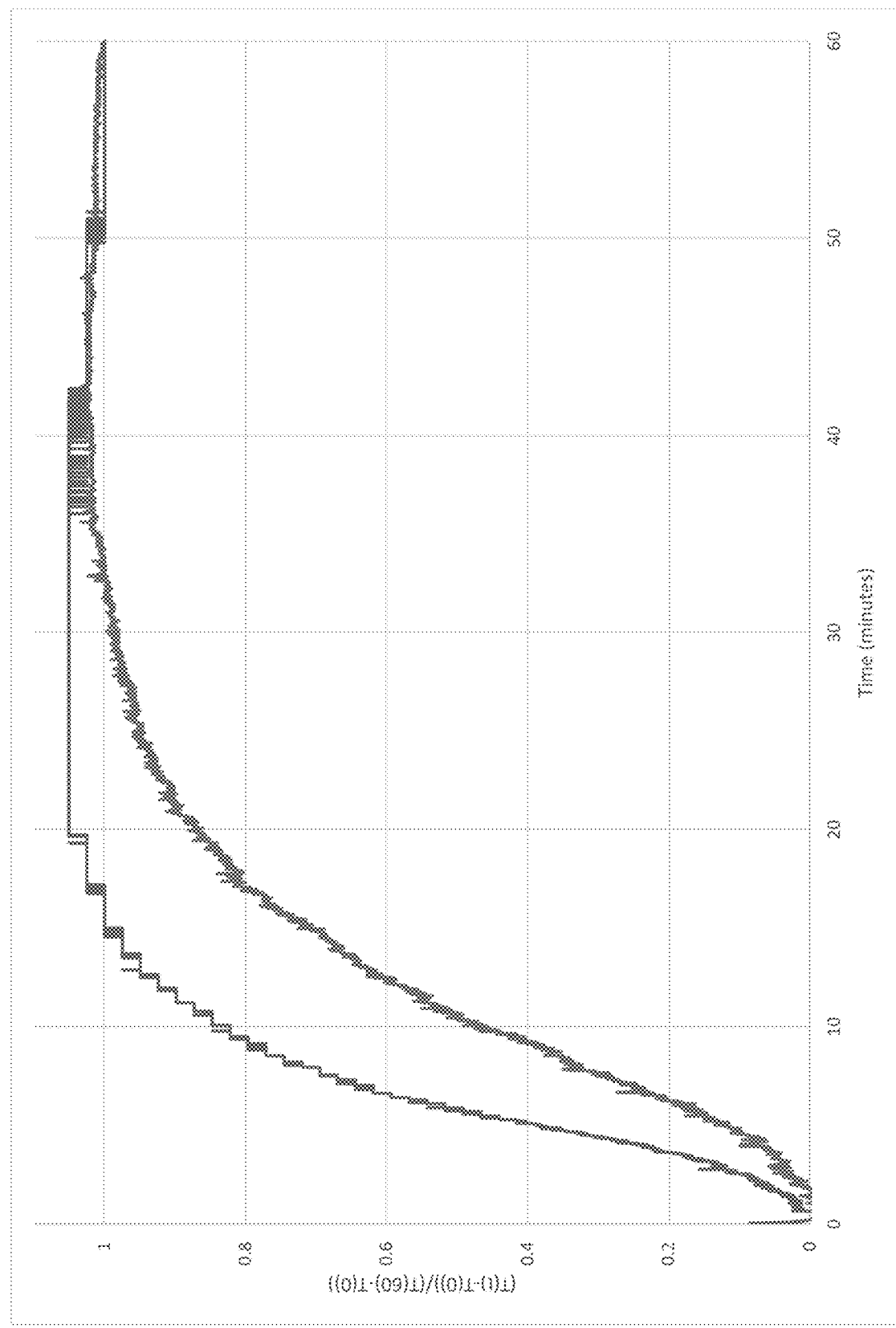
FIG. 6 is a graph comparing the relative torque build-up depicting the dissolution behavior in paint as a function of time for powdered samples produced in Example 6 as Type 3 at 300 rpm and 500 rpm.

The ingredients of Table 2 were mixed to form a mixture except for Natrosol, Type 3 and water listed in Let-down Stage. Natrosol and water were added to the mixture. Then Type 3 solids were added. Torque data was collected as a function of time. The comparison of dissolution characteristics of Type 3 powders in paint at 300 rpm and 500 rpm is shown in FIG. 6. At the end of the dissolution study (one hour), KU and ICI viscosities of the resulting paints were measured at 109 KU/2.3P and 109.8 KU/2.3P for the samples mixed at 300 and 500 rpm, respectively.

Paint Thickening Testing

The paint thickening test using the samples of the preceding Examples was carried out using 31 PVC small particle size acrylic latex paint formulation.

Example 9

A paint was made using the formulation listed in the table below. First, dry Type 3 and Type 1 $C_{16}$-HMPAPE samples were each added into the water that counted as 15.21 wt % of the formulation. Following the paint making process, the obtained paint was creamy and smooth with no detectable undissolved particles. The KU and ICI viscosities of the resulting paints were measured at 96.8 KU and 0.90 P ICI.

| Ingredient | Weight % |
| --- | --- |
| Grind Stage | |
| Water | 15.21 |
| Type 3 | 0.41 |
| Type 1 $C_{16}$-HMPAPE | 0.10 |
| Igepal ® CO-630 | 0.18 |
| Strodex ™ PK-0VOC[1] | 0.18 |
| Tamol ™ 731A | 0.64 |
| Ammonium hydroxide (28%) | 0.18 |
| Strodex ™ FT-428[2] | 0.18 |
| Drewplus ™ T-4304[3] | 0.28 |
| Nuosept ™ 498G[4] | 0.18 |
| Attagel ® 500[5] | 0.18 |
| Tronox ® CR-826[6] | 22.99 |
| Optiwhite MX ®[7] | 2.30 |
| Minex ® 7[8] | 3.68 |
| Water | 3.03 |
| Let-down Stage | |
| Rhoplex ™ VSR-1050[9] | 41.37 |
| Texanol ™ | 0.44 |
| Fungitrol ™ 940G[10] | 0.74 |
| Drewplus ™ T-4304 | 0.18 |
| Water | 7.53 |

[1] Potassium salt of a phosphate coester of aliphatic alcohols, commercially available from Ashland LLC.
[2] Phosphate ester surfactant, commercially available from Ashland LLC.
[3] A foam control agent, commercially available from Ashland LLC.
[4] An aqueous dispersion of 1,2-benziothiasothiazolin-3-one, commercially available from Ashland LLC.
[5] An inert gelling grade of attapulgite, commercially available from BASF Corporation.
[6] Rutile titanium dioxide, commercially available from Tronox Limited.
[7] Calcium aluminum silicate, commercially available from Burgess Pigment.
[8] A micronized functional filler, The Cary Company.
[9] Acrylic binder, commercially available from The Dow Chemical Company.
[10] A water-based dispersion of 40% 3-iodo-2-propynyl butylcarbamate, commercially available from Troy Corporation.

Example 10

A paint was made using the formulation listed in the table below. First, dry Type 3 sample was added into the water that counted as 15.21 wt % of the formulation and the paint formulation was made according to the process above. Aquaflow™ NLS220 (0.77 wt %) was added at the end of paint making process to produce paint with the viscosities of 103.3 KU and 1.035 P ICI. The obtained paint was creamy and smooth with no detectable undissolved particles.

| Ingredient | Weight % |
| --- | --- |
| Grind Stage | |
| Water | 15.21 |
| Type 3 | 0.41 |
| Igepal ® CO-630 | 0.18 |
| Strodex ™ PK-0VOC | 0.18 |
| Tamol ™ 731A | 0.64 |
| Ammonium hydroxide (28%) | 0.18 |
| Strodex ™ FT-428 | 0.18 |
| Drewplus ™ T-4304 | 0.28 |
| Nuosept ™ 498G | 0.18 |
| Attagel ® 50 | 0.18 |
| Tronox ® CR-826 | 22.99 |
| Optiwhite MX ® | 2.30 |
| Minex ® 7 | 3.68 |
| Water | 3.03 |
| Let-down Stage | |
| Rhoplex ™ VSR-1050 | 41.37 |
| Texanol ™ | 0.44 |
| Fungitrol ™ 940G | 0.74 |
| Drewplus ™ T-4304 | 0.18 |
| Water | 6.86 |
| Aquaflow ™ NLS220[1] | 0.77 |

[1] A nonionic synthetic associate thickener commercially available from Ashland LLC.

Example 11

A paint was made using the formulation listed in the table below. First, dry Type 1 $C_{16}$-HMPAPE sample was added into the water that counted as 15.21 wt % of the formulation and the paint formulation was made according to the process above. Aquaflow™ NHS300 was added at the end of paint making process to produce paint with the viscosities of 105 KU and 1.18 P ICI. The obtained paint was creamy and smooth with no detectable undissolved particles.

| Ingredient | Weight % |
|---|---|
| Grind Stage | |
| Water | 15.21 |
| Type 1 $C_{16}$-HMPAPE | 0.1 |
| Igepal® CO-630 | 0.18 |
| Strodex™ PK-0VOC | 0.18 |
| Tamol™ 731A | 0.64 |
| Ammonium hydroxide (28%) | 0.18 |
| Strodex™ FT-428 | 0.18 |
| Drewplus™ T-4304 | 0.28 |
| Nuosept™ 498G | 0.18 |
| Attagel® 50 | 0.18 |
| Tronox® CR-826 | 22.99 |
| Optiwhite MX® | 2.30 |
| Minex® 7 | 3.68 |
| Water | 3.03 |
| Let-down Stage | |
| Rhoplex™ VSR-1050 | 41.37 |
| Texanol™ | 0.44 |
| Fungitrol™ 940G | 0.74 |
| Drewplus™ T-4304 | 0.18 |
| Water | 5.84 |
| Aquaflow™ NHS300[1] | 2.10 |

[1] A nonionic synthetic associate thickener commercially available from Ashland LLC.

Example 12

Dry Type 4 was added to the water that counted as 15.21 wt % of the formulation and the paint formulation was made according to the process above. Aquaflow™ NLS220 was added at the end of paint making process to produce paint with the viscosities of 104 KU and 1.033 P ICI. The obtained paint was creamy and smooth with no detectable undissolved particles.

| Ingredient | Weight % |
|---|---|
| Grind Stage | |
| Water | 15.21 |
| Type 4 | 0.41 |
| Igepal® CO-630 | 0.18 |
| Strodex™ PK-0VOC | 0.18 |
| Tamol™ 731A | 0.64 |
| Ammonium hydroxide (28%) | 0.18 |
| Strodex™ FT-428 | 0.18 |
| Drewplus™ T-4304 | 0.28 |
| Nuosept™ 498G | 0.18 |
| Attagel® 50 | 0.18 |
| Tronox® CR-826 | 22.99 |
| Optiwhite MX® | 2.30 |
| Minex® 7 | 3.68 |
| Water | 3.03 |
| Let-down Stage | |
| Rhoplex™ VSR-1050 | 41.37 |
| Texanol™ | 0.44 |
| Fungitrol™ 940G | 0.74 |
| Drewplus™ T-4304 | 0.18 |
| Water | 6.86 |
| Aquaflow™ NLS220 | 0.77 |

What is claimed is:

1. A particulate product, comprising a nonionic synthetic associative thickener (NSAT), wherein the NSAT has an average particle size in a range from about 0.5 to about 5.0 mm and at least about 10% by weight of the NSAT is retained on a 1.18 mm sieve (No. 16) measured according to ASTM C136-06 Standard Test Method for Sieve Analysis of Fine and Coarse Aggregates.

2. The particulate product of claim 1, further comprising a dispersing agent present in an amount of from about 1 to about 15% by solids weight based on the weight of NSAT.

3. The particulate product of claim 2, wherein the dispersing agent comprises silica.

4. The particulate product of claim 1, wherein at least 20% by solids weight of the NSAT has an average particle size of 1.18 mm.

5. The particulate product of claim 2, wherein the dispersing agent is present in an amount of from about 3 to about 14% by solids weight based on the weight of NSAT.

6. The particulate product of claim 5, wherein the dispersing agent is present in an amount of from about 3 to about 10% by solids weight based on the weight of NSAT.

7. The particulate product of claim 6, wherein the dispersing agent is present in an amount of from about 3 to about 5% by solids weight based on the weight of NSAT.

8. The particulate product of claim 3, wherein silica has an average particle size of greater than 150 nm.

9. The particulate product of claim 8, wherein the silica has an average particle size of 200 nm to 200 μm.

10. The particulate product of claim 1, wherein the NSAT is selected from the group consisting of hydrophobically-modified polyacetal polyether (HMPAPE), hydrophobically-modified ethoxylated urethane (HEUR), hydrophobically-modified polyethylene glycol (HMPEG) and combinations thereof.

11. The particulate product of claim 10, wherein the HMPAPE comprises a polyacetal polyether backbone and a hydrophobic group.

12. The particulate product of claim 11, wherein the hydrophobic group is selected from the group consisting of alkyl, aryl, alkylaryl, and cycloaliphatic moieties.

13. The particulate product of claim 12, wherein the hydrophobic group is an alkyl moiety having from about 4 to about 16 carbon atoms.

14. The particulate product of claim 13, wherein the alkyl moiety has from about 4 to about 14 carbon atoms.

15. The particulate product of claim 14, wherein the alkyl moiety has from about 4 to about 12 carbon atoms.

16. The particulate product of claim 1, further comprising an additional rheology modifier.

17. The particulate product of claim 16, wherein the additional rheology modifier comprises a cellulose ether.

18. An aqueous coating composition comprising a film-forming polymer and the particulate product of claim 1.

19. The aqueous coating composition of claim 18, wherein the film-forming polymer comprises a latex polymer.

20. The aqueous coating composition of claim 19, wherein the latex polymer is selected from the group consisting of acrylics, vinyl-acrylics, and styrene-acrylics.

21. The aqueous coating composition of claim 18, further comprising one or more of a coalescent, a solvent, a wetting agent, a defoamer, a matting agent, a dispersant, a thickener, a biocide, a mildewcide, a pigment, or a surfactant.

22. The aqueous coating composition of claim 18, comprising from about 0.1 wt % to about 5 wt % of the particulate product of claim 1.

23. The aqueous coating composition of claim 18, wherein the aqueous composition comprises a paint.

24. A method of producing an aqueous coating composition comprising:
  (a) adding a film-forming polymer to an aqueous solution; and
  (b) adding the particulate product of any one of claims 1 to 17 to the aqueous solution to form the aqueous coating composition.

25. The method of claim 24, wherein the particulate product is added to the aqueous solution before the film-forming polymer is added to the aqueous solution.

26. The method of claim 24, wherein the particulate product is added to the aqueous solution after the film-forming polymer is added to the aqueous solution.

27. The method of claim 24, wherein the particulate product is added to the aqueous solution at the same time the film-forming polymer is added to the aqueous solution.

28. The method of claim 24, wherein the film-forming polymer comprises a latex polymer.

29. The method of claim 24, wherein the aqueous composition comprises a paint.

\* \* \* \* \*